Sept. 29, 1936.　　　　　G. H. TRAUT　　　　　2,056,115
DIRECTION INDICATOR FOR MOTOR VEHICLES
Filed Nov. 22, 1932
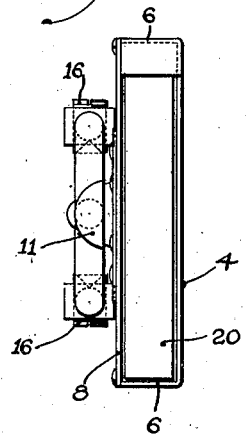
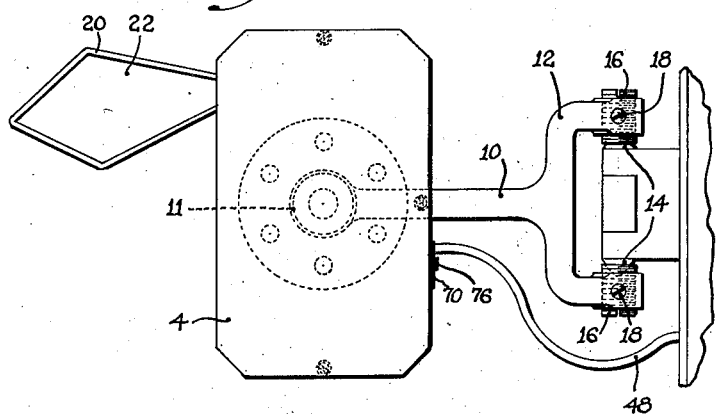
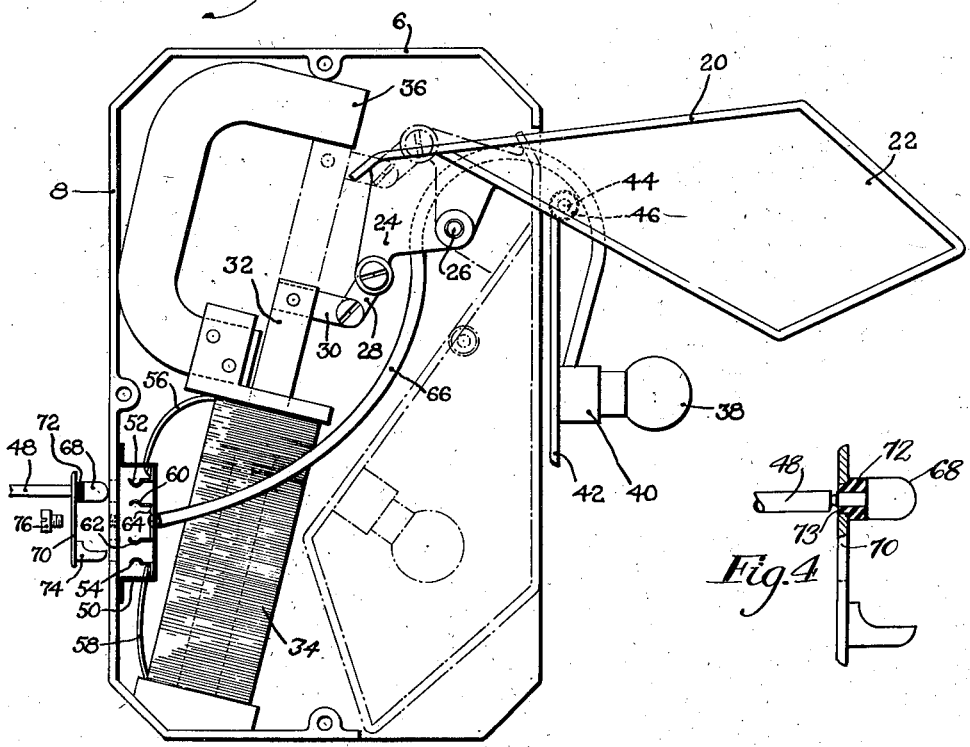
Witness
H. E. Van Dine
Inventor
Georg H. Traut
By his attorneys
Van Everen, Fish, Hildreth & Cary Patented Sept. 29, 1936

2,056,115

UNITED STATES PATENT OFFICE 2,056,115

DIRECTION INDICATOR FOR MOTOR VEHICLES

Georg H. Traut, Sharon, Mass.

Application November 22, 1932, Serial No. 643,821

1 Claim. (Cl. 177—329)

The present invention relates to direction indicators for motor vehicles.

The object of the present invention is to provide a simple, compact, reliable direction indicator which can be readily observed from any position in the rear.

With this object in view, the principal feature of the invention comprises a direction indicator assembly in a compact casing which may be attached to a bracket at the side of the vehicle, preferably to the door hinge. The casing may be provided with a mirror surface in order that the operator may observe the approach of vehicles from the rear.

In the accompanying drawing, Fig. 1 is a front elevation with the cover removed; Fig. 2 is a rear elevation showing the indicator in position; Fig. 3 is a side elevation of the improved indicator; and Fig. 4 is an enlarged view, partly in section, of the reversible contact assembly.

The illustrated embodiment of the invention comprises a casing having a polished rear wall 4, side and end walls 6, and a front cover 8. The rear and side walls are preferably stamped or cast in a single piece in order to avoid the use of any screws or other fastening means on the rear surface. The rear surface may be chrome-plated and highly polished to serve as a mirror, or if desired, a silvered mirror may be attached thereto.

An arm 10 is attached to the front cover by a ball and socket joint 11 which permits adjustment of the mirror in any desired angular position. The arm 10 is bifurcated at 12 to form a bracket to embrace the pintle 14 of the door hinge. The bracket is secured to the pintle by means of two countersunk screws 16 which are locked by set screws 18.

The direction indicator comprises a semaphore 20 consisting of a metal frame with translucent windows 22 preferably of frosted celluloid, red in color. The semaphore in indicating position is shown in full lines in Fig. 1 and in inactive position in dot-and-dash lines within the casing. The semaphore is attached to a bracket 24 which is pivoted within the casing on a pin 26. A link 28 is pivoted both to the bracket and to an arm 30 which is attached to the upper end of a magnetic solenoid core 32. A longitudinal movement of the core produces a swinging movement of the semaphore, without the use of any pin-and-slot or other unsatisfactory mechanical connections.

The core 32 is actuated by a solenoid 34 which is suitably attached to the inner wall of the casing.

In order to hold the semaphore in inactive position without the use of latches, a permanent magnet 36 is mounted within the casing having one pole in a position to engage the upper end of the core, the other pole being of diminished length to lie adjacent to the solenoid, as shown in Fig. 1. As described in my Patent No. 1,701,738, the permanent magnet holds the core firmly in position against shocks and jars under normal running conditions. The solenoid is so connected that when it is energized, it induces in the core a pole of the same polarity as the upper pole of the permanent magnet, thereby immediately repelling the core and causing the semaphore to rise quickly to indicating position. Moreover, since the core lies across the poles of the permanent magnet, it acts as a keeper to conserve the magnetism thereof.

Within the semaphore 20 is a lamp 38 which is received in a socket 40 mounted on a pivoted bracket 42. The bracket 42 forms a door for the lower edge of the semaphore and is pivoted on the pin 44. A torsion spring 46 normally holds the bracket in position within the semaphores and permits the bracket to be opened for the purpose of replacing the lamp.

A single cable 48 which leads outwardly through an opening in the side of the vehicle and which may include any suitable switch is used to energize the solenoid and the lamp. Inasmuch as the solenoid must be energized with proper polarity, owing to its relation to the permanent magnet, means are provided to permit a selective connection, depending on which pole of the battery is grounded. Within the casing is provided a frame of insulating material with two spring solenoid contacts 52 and 54 at opposite ends, these contacts being electrically connected to opposite ends of the solenoid by wires 56 and 58. Paired with the contacts 52 and 54 are spring lamp contacts 60 and 62 respectively which project from an integral plate 64 attached to the frame 50. The plate 64 connects by a wire 66 with the lamp socket 40. The cable 48 connects with a live contact plug 68 which is mounted on a metal plate 70 but insulated therefrom by a washer 72. As shown in Fig. 4, the plug 68 has a neck extending through a sleeve-like portion 73 of the washer, the neck being electrically connected with the cable. At the other end of the plate is mounted a ground contact 74 which is cut away at one side so that it can engage only the outer contact 52 or 54. The plug contacts are inserted through holes in the casing wall and the plate is secured by a screw 76. As shown, the plug contact 68 will engage the spring contacts 52 and 60 and the ground contact will engage only the solenoid contact 54. Should the semaphore fail to operate because of improper polarization, the plate 70 is merely reversed, so that the contact 68 engages both contacts 54 and 62, and the ground contact engages only the solenoid contact 52. The lamp is energized on either connection through the wire 66.

Preferably two direction indicators are used, one on each side of the car, to indicate both left and right turns. The present invention is a compact device, of pleasing appearance, with provision for displaying the semaphore at a sufficient distance outwardly from the side of the vehicle so that it can be readily observed by motorists approaching at substantially any position in the rear.

Having thus described the invention, what is claimed is:

A direction signal indicator comprising a casing, a semaphore, a lamp, a solenoid having an armature, connections between the armature and semaphore to operate the semaphore, a retaining magnet of the permanent type engaging the armature to hold the semaphore in inactive position, a cable, a live contact connected thereto, a grounded contact carried by the cable and insulated therefrom, contacts connected with the ends of the solenoid and adapted for selective engagement with the cable contacts to polarize the solenoid properly with respect to the retaining magnet, a lamp, and a contact connected with the lamp and adapted to be engaged with said live contact for either position of the latter.

GEORG H. TRAUT.